United States Patent [19]
DiGregorio

[11] Patent Number: 4,969,252
[45] Date of Patent: * Nov. 13, 1990

[54] METHOD OF ASSEMBLING A MAGNETIC TAPE HEAD HAVING A BRASS SHIELD

[75] Inventor: Germano DiGregorio, Arvada, Colo.

[73] Assignee: Storage Technology Corporation, Louisville, Colo.

[ * ] Notice: The portion of the term of this patent subsequent to Aug. 8, 2006 has been disclaimed.

[21] Appl. No.: 426,101

[22] Filed: Oct. 24, 1989

[51] Int. Cl.$^5$ .............................................. G11B 5/42
[52] U.S. Cl. ...................................... 29/603; 29/467; 29/468; 29/744; 29/759
[58] Field of Search ................. 29/603, 744, 467, 468, 29/759

[56] References Cited
U.S. PATENT DOCUMENTS 4,854,036  8/1989  DiGregorio ........................... 29/744

Primary Examiner—Carl E. Hall
Attorney, Agent, or Firm—Dorr, Carson, Sloan & Peterson

[57] ABSTRACT

The automated magnetic tape drive read/write head module assembly apparatus enables a worker to completely assemble and align the read/write head module in a single step process. A read/write head assembly fixture that securely holds the rectangular-shaped read/write head frame in a fixed position. A read head and write head alignment tool is pivotally attached to the read/write head assembly fixture for magnetically suspending the read head and write head in the rectangular-shaped opening in the read/write head frame in a predetermined position. A brass shield loader apparatus automatically places a brass shield between the suspended read and write heads. The alignment tool includes an aperture such that the worker can view the transducing gaps on the read head and the write head for alignment purposes. Two sets of threaded rods are included in this assembly apparatus to modify the lateral position of the read head and the write head such that the transducing gaps on these two heads are in exact alignment with respect to each other. Once the alignment process is completed, a leaf spring is inserted between one inner wall of the rectangular-shaped read/write head frame and the read/write heads to maintain the alignment of their transducing gaps.

16 Claims, 6 Drawing Sheets

METHOD OF ASSEMBLING A MAGNETIC TAPE HEAD HAVING A BRASS SHIELD

FIELD OF THE INVENTION

This invention relates to magnetic tape drive read/write head modules and, in particular, to an apparatus and method for automatically and efficiently assembling these modules.

PROBLEM

It is a problem in the field of magnetic tape drives to assemble the read/write head modules with precise alignment and in a timewise efficient manner. In a magnetic tape drive, the read/write head module consists of a substantially rectangular-shaped frame that has a rectangular-shaped opening therein into which is placed the read head and the write head. The read and write heads each have a multiplicity of discrete transducing gaps aligned along one face of the head. In the read/write head module, the read head and write head are placed adjacent to each other and the transducing gaps on each of these heads must be exactly aligned so that corresponding transducing gaps on the read head and write head align with a single data storage track on the magnetic tape in the tape drive.

In order to obtain precise alignment of the transducing gaps in the read head and the write head, the read/write head module is assembled in a two step process. Typically the first step of the process is to place the read head and the write head side by side in an assembly fixture where the position of the read and write heads are adjusted so that the respective transducing gaps on the read and write heads are in exact alignment. In addition, the relative vertical alignment of the read head and write head are adjusted so that the face that contains the transducing gaps on the read and write heads are coplanar so that the magnetic tape comes evenly in contact with both the read head and the write head. Once the exact alignment of the read head and write head is accomplished in this assembly fixture, the read and write heads are interconnected by the use of an adhesive to retain the alignment obtained in this assembly step. Once the adhesive has cured, the read/write heads are removed from this assembly fixture and placed in the rectangular-shaped opening the read/write head frame. A leaf spring is inserted between the read/write heads and one inner wall of the rectangular shared read/write head frame such that the adhesively interconnected read/write heads are pressed against the opposite inner wall of the rectangular-shaped read/write head frame. The tension of this leaf spring is varied by the use of an adjustable screw that is movable within a threaded aperture through the wall of the rectangular-shaped read/write head frame. This screw bears on the center of the convex surface of a leaf spring to vary the amount of force the leaf spring places on the read/write heads as they are forced against the opposite inner wall of the rectangular-shaped read/write head frame.

The above described two step assembly process is both labor intensive and expensive. The necessity to precisely align the respective transducing gaps on the read and write heads as well as the need to provide a precisely controlled clamping force to exactly align the read/write heads within the rectangular-shaped read/write head frame all require significant manual intervention by a worker. The result is that the magnetic tape read/write head modules are expensive devices due to the precision alignment requirements of these modules.

SOLUTION

The above described problems are solved and a technical advance achieved in the field by the magnetic tape head brass shield loader station of the present invention. The two step assembly process of the prior art is replaced by an automated assembly apparatus, including a read/write head assembly fixture, that enables a worker to completely assembly and align the read/write head module in a single step process.

The automated read/write head module assembly apparatus includes a brass shield loader apparatus that automatically and precisely positions a brass shield with respect to the read and write heads. A read/write head assembly fixture securely holds the rectangular-shaped read/write head frame in a fixed position. A read head and write head alignment tool is pivotally attached to the read/write head assembly fixture for suspending the read head and write head in the rectangular-shaped opening in the read/write head frame in a predetermined position. This alignment tool consists of two parallel arms, each of which includes a magnet to magnetically suspend the read head and write head from the bottom of this tool. The worker places the read head on the magnets located on these two parallel arms and then rotates this alignment tool such that the parallel arms are placed in position juxtaposed with two opposite inner walls of the rectangular-shaped read/write head frame such that the read head is suspended in a predefined position within the rectangular-shaped opening in the read/write head frame. This alignment tool includes an aperture such that the worker can view the transducing gaps on the read head and the write head for alignment purposes.

To assemble the read/write head, the worker places the read/write head assembly fixture in place on a brass shield loader apparatus. The read head is then manually inserted into the read/write head assembly fixture and the brass shield loader apparatus is operated to precisely place the brass shield in position against the read head. The write head is then manually inserted into the read/write head assembly fixture, juxtaposed with the brass shield. Thus, the brass shield is in place between the read head and the write head.

Two threaded rods are included in this read/write head module assembly apparatus. The pair of threaded rods are positioned at the ends of the read and write heads, such that they can be used to modify the lateral position of the read head and the write head with respect to the inner walls of the rectangular-shaped read/write head frame. By use of threaded rods, the worker can adjust the relative position of the read head and the write head such that the transducing gaps on these two heads are in exact alignment with respect to each other. The brass shield loader apparatus maintains the brass shield in position between the read and write heads. The magnets in the parallel arms of the alignment tool maintain the read and write heads in coplanar alignment so that adjustment in all three dimensions is precisely provided. Once the alignment process is completed, a leaf spring is inserted between one inner wall of the rectangular-shaped read/write head frame and the read/write heads. An adjusting screw is inserted through a threaded aperture in the wall of the rectangular shared read/write head frame such that it can be used to adjust the clamping force provided by the leaf spring on the read/write heads. Once the leaf spring is in position and properly adjusted, the leaf spring provides continued alignment of the read/write heads with respect to the inner wall of the rectangular-shaped read/write head frame.

Thus, this apparatus enables the worker to assemble the magnetic tape drive read/write head modules in a single operation. This apparatus provides precise alignment of the transducing gaps of the read head and write head, precise positioning of the brass shield, while also maintaining the top surface of the read and write heads in a coplanar orientation. The use of this apparatus reduces the labor content in the assembly process yet maintains the precision required in the alignment of these heads, thereby significantly reducing the cost of producing the magnetic tape drive read/write head modules. These and other features and advantages of this invention will be ascertained by a reading of the following detailed description.

DETAILED DESCRIPTION OF THE DRAWING

Figure 1:
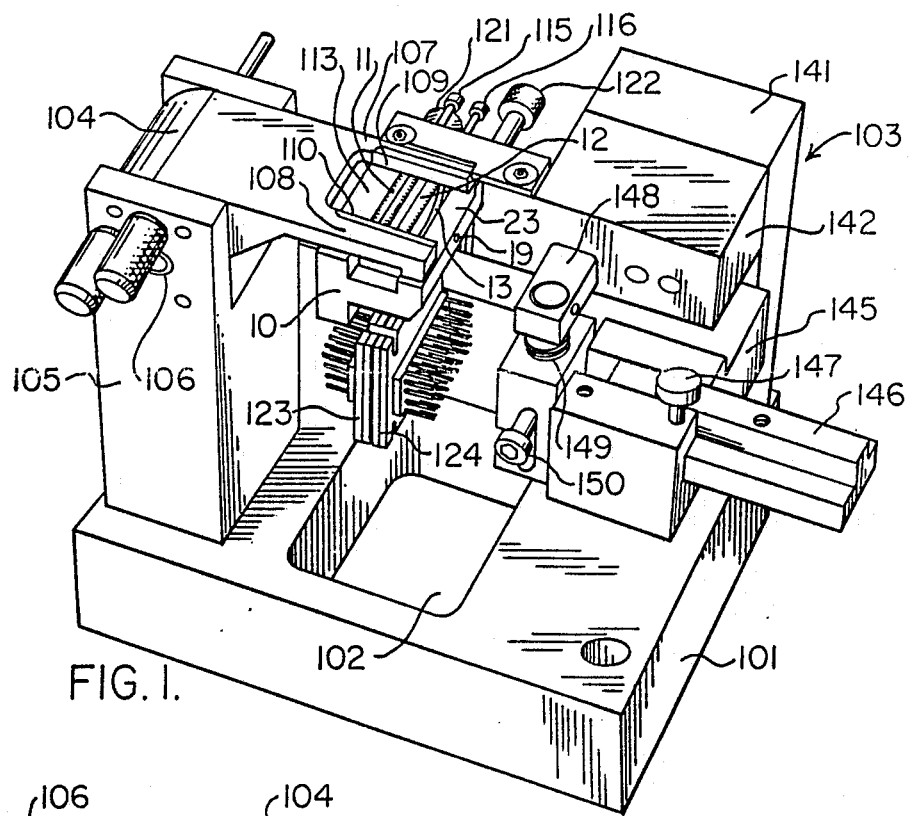
FIG. 1 illustrates the magnetic tape drive read/write head module assembly apparatus in perspective view.

In a magnetic tape drive, the read/write head module consists of a substantially rectangular-shaped frame that has a rectangular-shaped opening therein into which is placed the read head and the write head. The read and write heads each have a multiplicity of discrete transducing gaps aligned along one face of the head. In the read/write head module, the read head and write head are placed adjacent to each other, separated by a metal shield. The transducing gaps on each of these heads must be exactly aligned so that corresponding transducing gaps on the read head and write head align with a single data storage track on the magnetic tape in the tape drive.

The apparatus and method for automatically assembling magnetic tape drive read/write head modules of the present invention provides an automated assembly apparatus, including a read/write head alignment fixture, that enables a worker to completely assemble and align the read/write head module in a single step process. The read/write head module automated assembly apparatus includes a brass shield loader apparatus that automatically and precisely positions a brass shield with respect to the read and write heads. A read/write head assembly fixture securely holds the rectangular-shaped read/write head frame in a fixed position. A read head and write head alignment tool is pivotally attached to the read/write head assembly fixture for suspending the read head and write head in the rectangular-shaped opening in the read/write head frame in a predetermined position. This alignment tool consists of two parallel arms each of which includes a magnet to magnetically suspend the read head and write head from the bottom of this tool. The worker places the read head on top of the magnets located on these two parallel arms and then rotates this alignment tool such that the parallel arms are placed in position juxtaposed with two opposite inner walls of the rectangular-shaped read/write head frame such that the read head is suspended in a predefined position within the rectangular-shaped opening in the read/write head frame. This alignment tool includes an aperture such that the worker can view the transducing gaps on the read head and the write head for alignment purposes.

To assembly the read/write head, the worker places the read/write head assembly fixture in place on the brass shield loader apparatus. The read head is then manually inserted into the read/write head assembly fixture and the brass shield loader apparatus is operated to precisely place the brass shield in position against the read head. The write head is then manually inserted into the read/write head assembly fixture, juxtaposed with the brass shield. Thus, the brass shield is in place between the read head and the write head.

Two threaded rods are included in this read/write head module assembly apparatus. The pair of threaded rods are positioned at the ends of the read and write heads, such that they can be used to modify the lateral position of the read head and the write head with respect to the inner walls of the rectangular-shaped read/write head frame. By use of threaded rods, the worker can adjust the relative position of the read head and the write head such that the transducing gaps on these two heads are in exact alignment with respect to each other. The brass shield loader apparatus maintains the brass shield in position between the read and write heads. The magnets in the parallel arms of the alignment tool maintain the read and write heads in coplanar alignment so that adjustment in all three dimensions is precisely provided. Once the alignment process is completed, a leaf spring is inserted between one inner wall of the rectangular-shaped read/write head frame and the read/write heads. An adjusting screw is inserted through a threaded aperture in the wall of the rectangular-shaped read/write head frame such that it can be used to adjust the clamping force provided by the leaf spring on the read/write heads. The leaf spring provides continued alignment of the read/write heads with respect to the inner wall of the rectangular-shaped read/write head frame.

Thus, this apparatus enables the worker to assemble the magnetic tape drive read/write head modules in a single operation. This apparatus provides precise alignment of the transducing gaps of the read head and write head while also maintaining the top surface of the read and write heads in a coplanar orientation. The use of this apparatus reduces the labor content in the assembly process yet maintains the precision required in the alignment of these heads, thereby significantly reducing the cost of producing the magnetic tape drive read/write head modules.

Read/Write Head Module Assembly Apparatus

Figure 2:
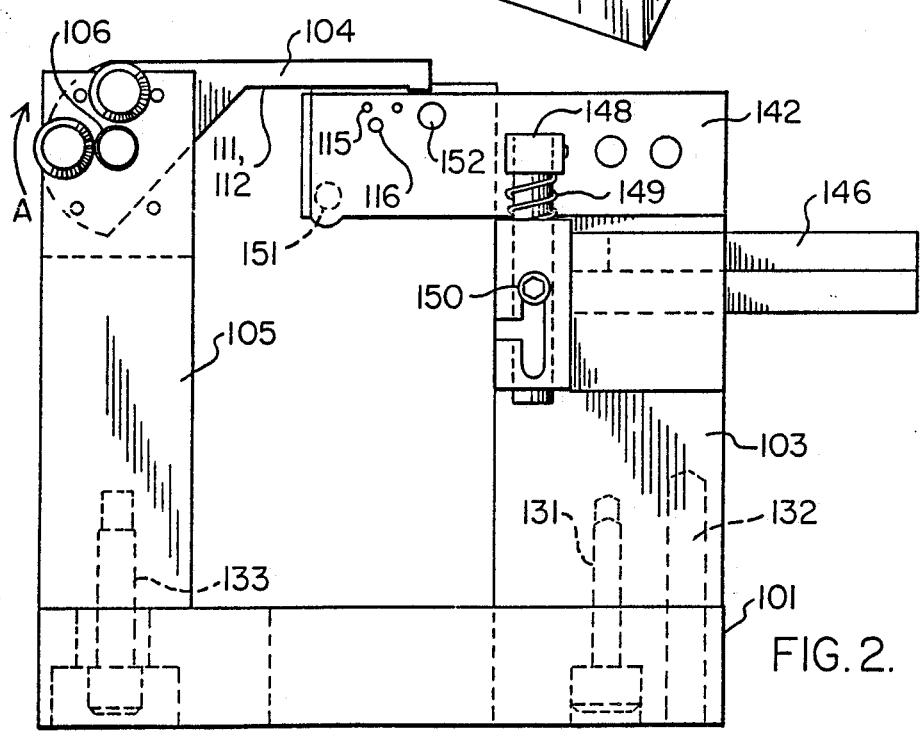
FIG. 2 illustrates a side view of the magnetic tape drive read/write head module assembly apparatus.
Figure 3:
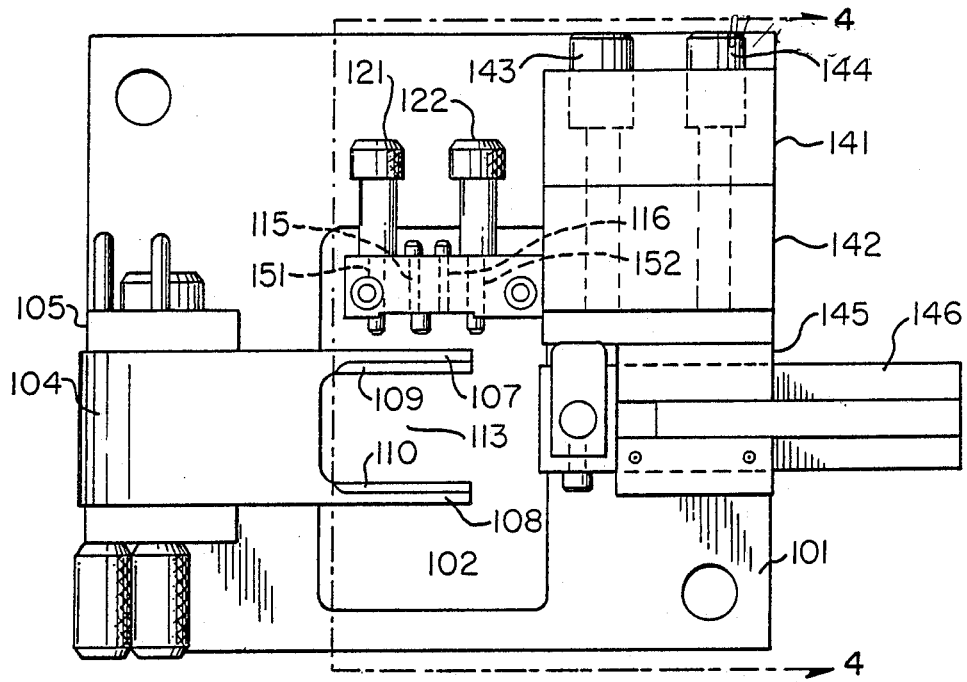
FIG. 3 illustrates the top view of the magnetic tape drive read/write head module assembly apparatus.
Figure 4:
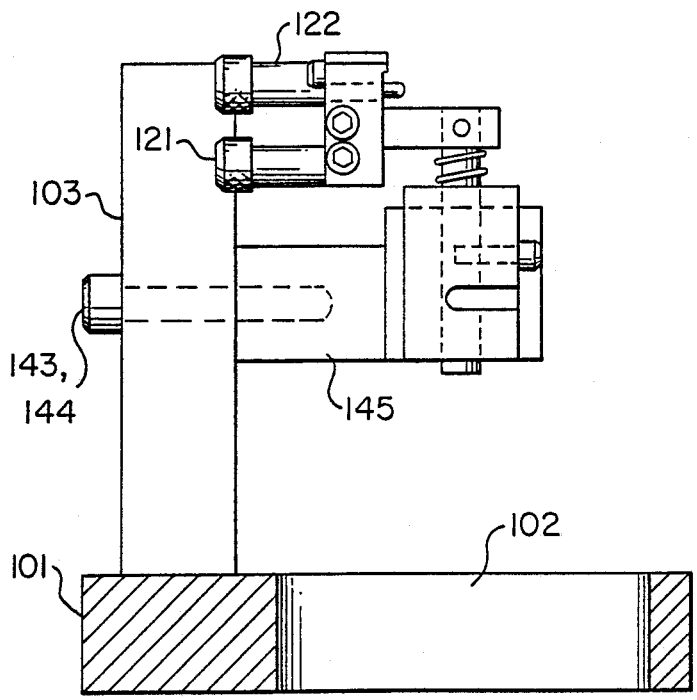
FIG. 4 illustrates an end view of the magnetic tape drive read/write head module assembly apparatus.

FIG. 1 illustrates a perspective view while FIGS. 2, 3, and 4 illustrate side, top and end views of the read/write assembly fixture 100 of the apparatus for assembling magnetic tape drive read/write head modules. This read/write head assembly fixture 100 includes a base 101 into which is provided an aperture 102, the function of which is described herein below. Attached to base 101 is a frame fixture 103 that functions to securely hold a rectangular-shaped read/write head frame 10 in a fixed position for the assembly of the magnetic tape drive read/write head module. Frame fixture 103 is securely fastened to base 101 by, for example, bolts 131, 132 inserted into threaded mating holes in base 101 and frame fixture 103. The rectangular-shaped read/write head frame 10 has an opening therein of a rectangular shape into which the read head 11 and write head 12 are positioned and later clamped as part of the assembly process described below.

Frame fixture 103 includes a vertical support member 141 that is secured to base 101 by bolts 131, 132. Vertical support member 141 thereby provides a positionally fixed support for the remaining apparatus of frame fixture 103. Frame adjustment support bracket 145 is attached to vertical support member 141 by bolts 143, 144 and supports frame position adjustment slider 146 which is translatable horizontally in a corresponding track in frame adjustment support bracket 145. An adjustment bolt 147 fastens frame position adjustment slider 146 in the proper horizontal position in the track in frame adjustment support bracket 145. In addition, adjustment bolt 150 controls the vertical position of arm 148, the shaft of which is encircled by spring 149. Thus, by adjusting the horizontal position of frame position adjustment slider 146 and the vertical position of arm 148, the position of read/write head frame support 142 is precisely determined. Read/write head frame support 142 includes threaded holes 151, 152 into which bolts 121, 122 are threaded to secure read/write head frame 10 against the side of read/write head frame support 142.

Frame 105 is securely fastened to base 101 by, for example, bolts 133 inserted in threaded, mating holes in base 101 and frame 105. Frame fixture 103 and frame 105 are, as can be seen in FIG. 1, mounted on the same surface of base 101, standing on opposite sides of aperture 102.

Alignment Tool

Figure 6:
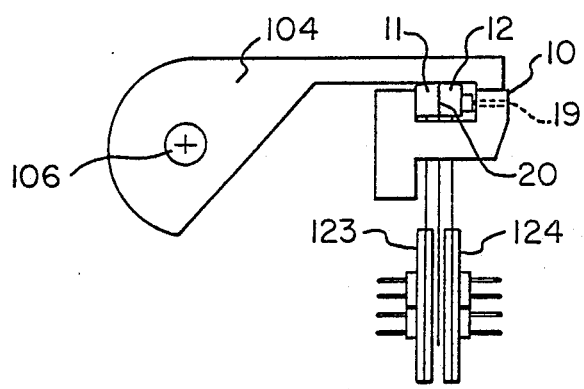
FIG. 6 illustrates a side view of the alignment tool and read/write heads.

Alignment tool 104 is connected by pivot pin 106 to frame 105, such that when alignment tool 104 is pivoted in the clockwise direction (shown by arrow A), the end of the alignment tool 104 comes in contact with the rectangular-shaped read/write head frame 10. Alignment tool 104 includes a pair of parallel spaced arms 107, 108 at the end opposite pivot pin 106, each of which includes a magnet 109, 110. The arms 107, 108 each also include a notch or groove 111, 112, respectively, into which the read 11 and write 12 heads are placed (FIG. 6). Thus, the grooves 111, 112 in arms 107, 108 provide for the precise positioning of the read head 11 and the write head 12 that are inserted therein. Magnets 109, 110 magnetically suspend the read head 11 and the write head 12 from the bottom of alignment tool 104, such that when alignment tool 104 is pivoted around pivot pin 106 to come in contact with read/write head frame 10, the read head 11 and the write head 12 that are magnetically suspended from the bottom of alignment tool 104 are placed in the rectangular-shaped opening in the read/write head frame 10 in a predetermined properly aligned position. The use of alignment tool 104 with its integral magnets 109, 110 insure that the transducer surfaces of read head 11 and write head 12 remain precisely coplanar with respect to each other. The arms 107, 108 of the alignment tool 104 provide an aperture 113 through which a worker has visual access to the transducer gap surface of read head 11 and write head 12. The worker can thereby view the transducer gaps through aperture 113 and perform an alignment function wherein the relative lateral position of read head 11 and write head 12 are adjusted such that the transducer gaps on these two heads are precisely aligned with respect to each other so that the tracks on the magnetic tape are exactly positioned over a corresponding transducer gap in both the read head 11 and the write head 12.

Read/Write Head Frame

Figure 5:
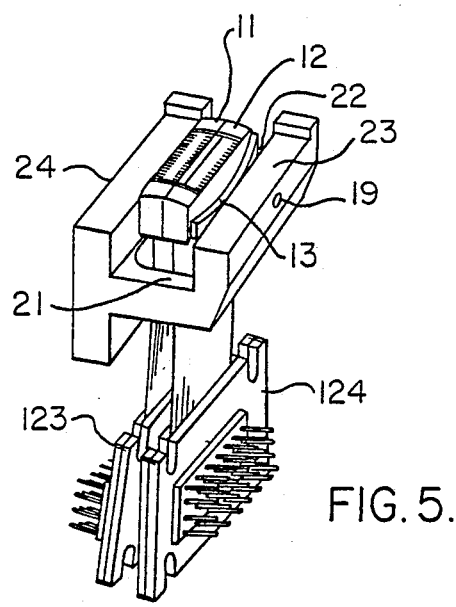
FIG. 5 illustrates a view of the read/write head frame details.

Read/write head frame 10 (FIG. 5) has a top surface that is substantially rectangular in shape, having a rectangular-shaped opening therein. The inner walls 21-24 of read/write head frame 10 inside the rectangular-shaped opening are used to precisely orient read head 11 and write head 12 in read/write head frame 10. Inner wall 24 is used as the read/write head registration surface and it is against inner wall 24 that read head 11 and write head 12 are secured.

In order to provide the lateral adjustment for the read head 11 and the write head 12, a pair of holes (not shown) are provided in the inner walls 21, 22 of read/write head frame 10 in corresponding mating relationship to the position of threaded rods 115, 116 in read/write head frame support 142. Threaded rods 115, 116 are inserted into these holes and are used to modify the lateral positioning of read head 11 and write head 12 with respect to the inner walls 21, 22 of the rectangular-shaped read/write head frame 10. In addition, a threaded hole 19 is provided in a third inner wall 23 of the rectangular-shaped read/write head frame 10 such that screw 14 can be threaded through hole 19 to come in contact with leaf spring 13 to thereby adjust the tension of leaf spring 13.

FIG. 6 illustrates a side view of the read head 11, write head 12, brass shield 14, read/write head frame 10, alignment tool 104 and the interrelationship thereof. Alignment tool 104 includes a notch 111, 112 cut in the bottom of arms 107, 108 respectively. A tape drive read/write head assembly worker inserts read head 11, write head 12, with their corresponding connectors 123, 124 up through the rectangular-shaped opening in read/write head frame 10 to come into contact with alignment tool 104. The brass shield loader apparatus (described below) inserts brass shield 14 in position between read head 11 and write head 12. The worker manually adjusts the position of read head 11 and write head 12 so that they are right justified (as seen in FIG. 6) against the edge of notches 111, 112. During this preliminary alignment operation, alignment tool 104 may be rotated a short distance in the counterclockwise direction to provide the worker with access to read head 11 and write head 12. The alignment tool 104 is then rotated clockwise to come into contact with read/write head frame 10 as shown in FIG. 6.

Brass shield Loader Apparatus

The read/write head includes a metal (e.g. brass) shield 14 (FIG. 6) that is located between read head 11 and write head 12. Brass shield 14 must be precisely positioned with respect to read head 11 and write head 12 during the assembly of the read/write head. This alignment is accomplished by the use of brass shield loader apparatus 200 (FIG. 7) which operates in a cooperative relationship with read/write head assembly fixture 100.

The brass shield loader apparatus 200 includes registration 201-206 and locking 207-210 mechanisms to secure read/write head assembly fixture 100 in a predetermined precisely defined position on base 211. Registration apparatus 201-206 includes a pair of registration bars 201, 202, each of which include a pair of position adjustment screws 203, 204 and 205, 206 respectively. The position adjustment screws 203-206 are set to locate base 101 of read/write head assembly fixture 100 such that aperture 102 in base 101 matches aperture 212 in base 211. The mating relationship of the apertures 102, 212 are maintained by the use of locking mechanism 207-210 which forces base 101 of read/write head assembly fixture 100 against registration mechanism 201, 203, 204. Locking mechanism 207-210 comprises a lever 207 connected via a pivot cam 205 to base 211. Guide 209 aligns the motion of spring loaded locking pin 210, which slides laterally in a mating hole in guide 209 under control of the rotation of pivot cam 208.

The brass shield loader apparatus 200 further includes loading mechanism 213-218 which functions to place brass shield 14 in position in read/write head assembly fixture 100. Loading mechanism 213-218 consists of a movable arm 213, which can be hydraulically or pneumatically activated, for moving in a vertical direction through aperture 212. Movable arm 213 has a brass shield holder 214-218 attached to the distal end thereof. Brass shield holder includes a pair of retainer plates 214, 215 which are connected to movable arm 213 by a pair of bolts 216, 217. Locking screw 218 serves to tighten retainer plates 214, 215 together. In operation, a worker places brass shield 14 between retainer plates 214, 215 and tightens screw 217 to securely hold brass shield 14 in place between retainer plates 214, 215. Movable arm 213 is then activated to move brass shield 14 down through aperture 212 until read/write head assembly fixture 100 is secured in place on plate 211. The operation of this apparatus is discussed in more detail below.

Read/Write Head Module Assembly Method

Figure 10:
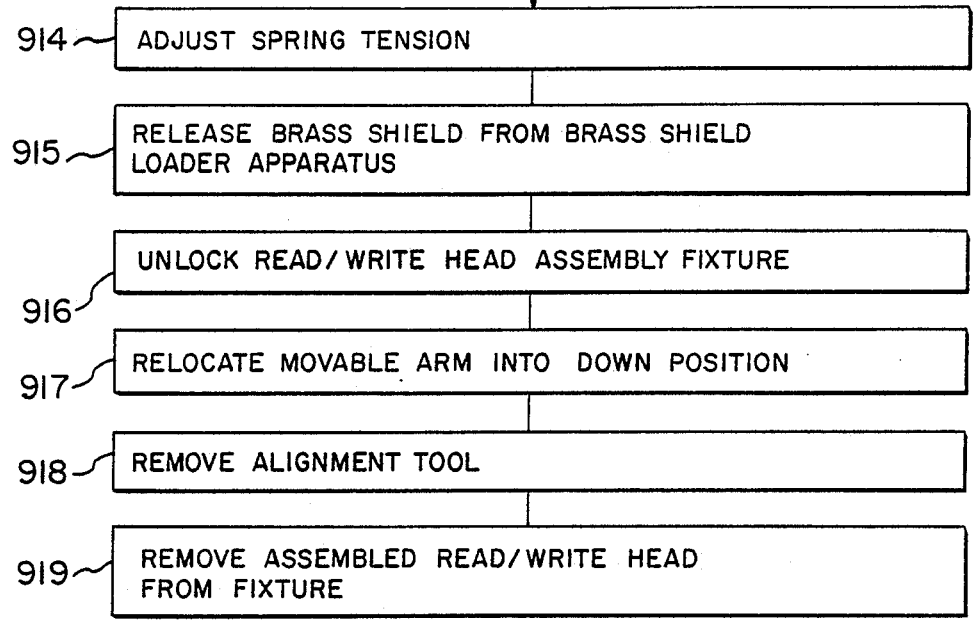
FIGS. 9 and 10 illustrate in flow diagram form the operational steps required by the use of this apparatus to assemble a magnetic tape drive read/write head module.
Figure 7:
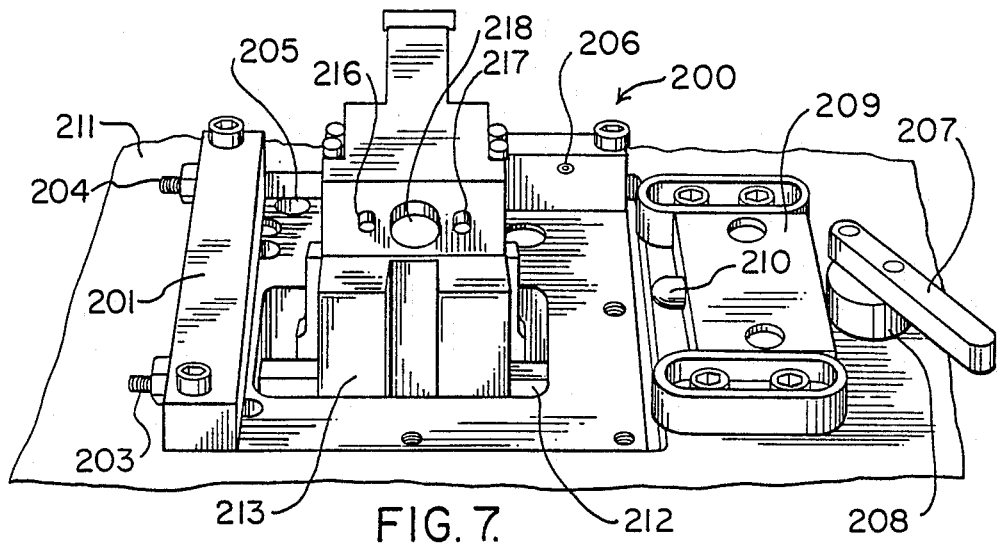
FIG. 7 illustrates the brass shield loader apparatus.
Figure 8:
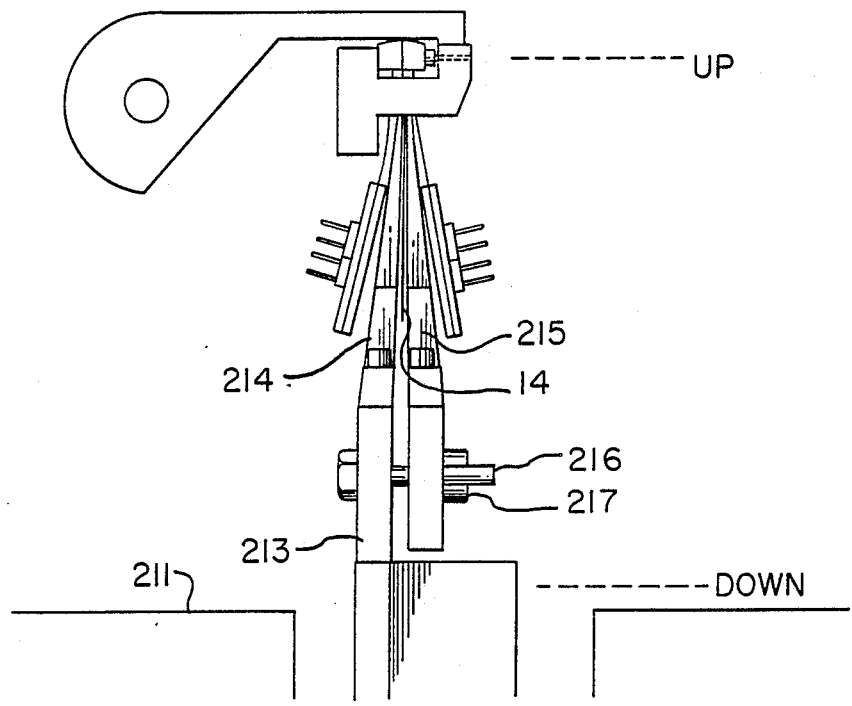
FIG. 8 illustrates the brass shield loader apparatus inserting the brass shield into the read/write head module.
Figure 9:
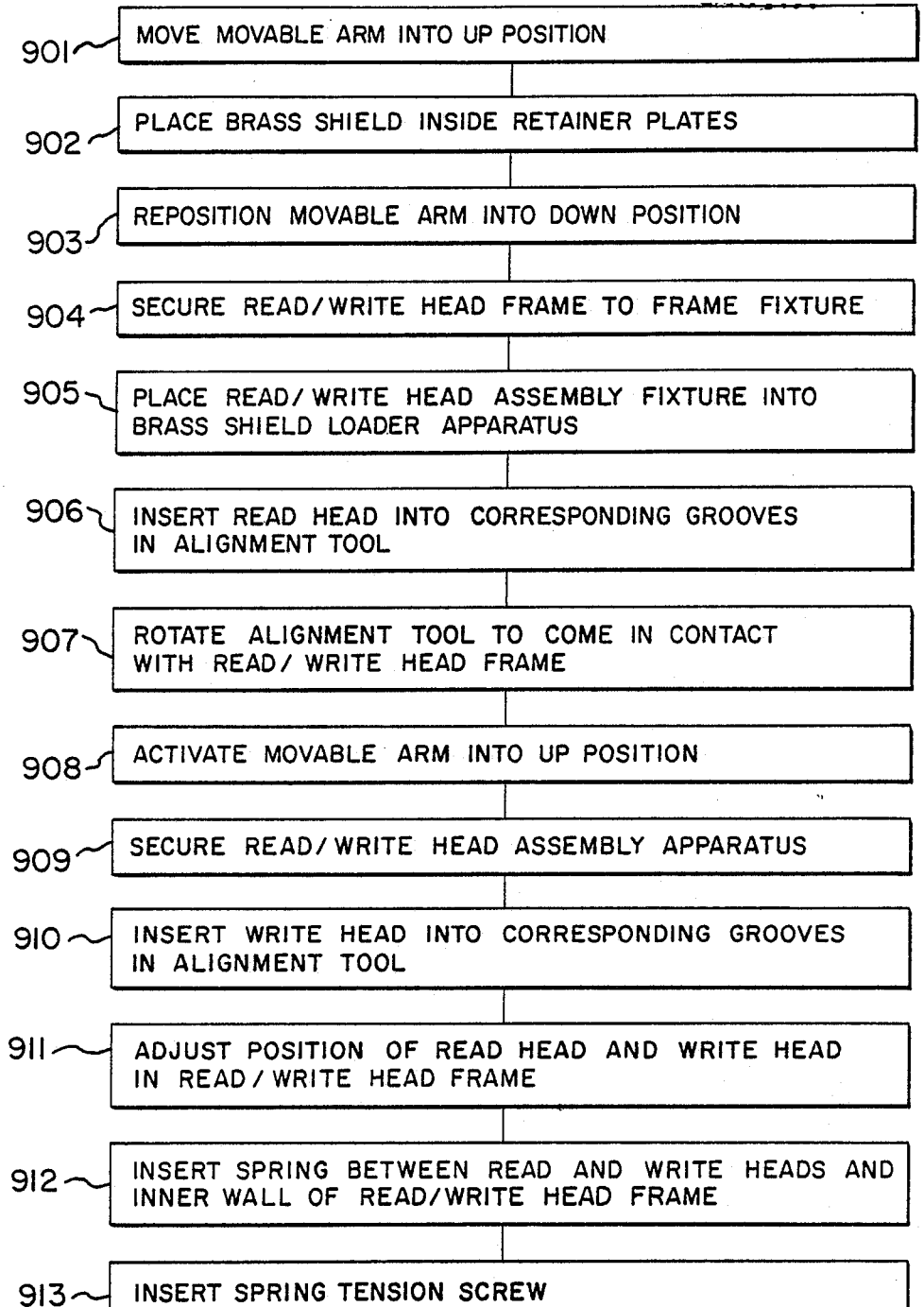

In order to better understand the operation of this apparatus, the assembly process is discussed using the flow chart of FIGS. 9, 10 to illustrate, step by step, the assembly process for the magnetic tape drive read/write head module. At step 901, the worker activates a switch (not shown) to move movable arm 213 into the UP position such that brass shield holder 214-218 protrudes through aperture 212 as shown in FIG. 7. The worker at step 902 places brass shield 14 between retainer plates 214, 215 and tightens locking screw 218 to hold brass shield 14 in position. At step 903, the movable arm 213 is repositioned into the DOWN position such that the brass shield holder 214-218 is located below plate 211.

At step 904, frame 10 is securely fastened to frame fixture 103 by the use of threaded rods or bolts 121, 122 inserted into threaded mating holes 151, 152 in frame fixture 103 and read/write head frame 10. At step 905, the read/write head assembly fixture 100, with frame 10, is placed on plate 211 so that apertures 102 and 212 align. A read head 11 is inserted at step 905 into the grooves 111, 112 in arms 107, 108 of alignment tool 104. Since the read head 11 and write head 12 are manufactured from a magnetic material, magnets 109 and 110 securely hold read head 11 and write head 12 flush against the surface of the bottom of groove 11, 112 of arms 107, 108 as shown in FIG. 6. Grooves 111, 112 insure that the transducer surfaces of read head 11 and write head 12 remain coplanar and that read head 11 and write head 12 are placed in precise position into the rectangular-shaped opening in the rectangular-shaped read/write head frame 10. Once the read head 11 is magnetically affixed to alignment tool 104, at step 907 the worker rotates alignment tool 104 in a clockwise direction until arms 107, 108 of alignment tool 104 come in contact with rectangular-shaped read/write head frame 10 and are in juxtaposed position to inner walls 21, 22 of the rectangular-shaped read/write head frame 10. When alignment tool 104 is in this position, read head 11 is magnetically suspended from alignment tool 104 in a predetermined position in the rectangular-shaped opening in the rectangular-shaped read/write head frame 10.

Brass Shield Insertion

At step 908, the worker again activates movable arm 213 to the UP position, thereby positioning brass shield 14 in place, juxtaposed to read head 11. The worker then closes locking mechanism 207-210 to secure read/write head assembly apparatus 100 in place. At step 910, the worker places write head 12 into grooves 111, 112 in arms 107, 108 of alignment tool 104 adjacent to brass shield 14. The worker can now view the position of read head 11 and write head 12 through aperture 113 of alignment tool 104. This visual inspection by the worker is accomplished by the use of a magnifying instrument such as a microscope or a large magnifying glass (not shown). The worker views the alignment of the transducer gaps on read head 11 and write head 12 and makes use of threaded rods 115, 116 placed through holes 15-16 respectively in inner walls 21, 22 of rectangular-shaped read/write head frame 10. The worker at step 911, uses threaded rods 115, 116 to modify the lateral positioning of read head 11 and write head 12 such that the transducer gaps on these two heads are precisely aligned with respect to each other. At this point, adjustment in two dimensions of the read and write head have been accomplished since alignment tool 104 maintains the transducer surfaces of read head 11 and write head 12 in a coplanar alignment while threaded rods 115, 116 align read head 11 and write head 12 in a lateral direction.

The remaining adjustment is the placement of the read/write heads in proximate relation to inner wall 24 of rectangular-shaped read/write head frame 10. This is accomplished by inserting spring 13 at step 912 between read/write heads 11, 12 and the remaining inner wall 23 of the rectangular-shaped read/write head frame 10. This leaf spring 13 applies a force to read/write heads 11, 12 to force them up against inner wall 24 of rectangular-shaped read/write head frame 10. The clamping force provided by leaf spring 13 is controlled by the use of screw 14 which is inserted at step 913 through threaded hole 19 in inner wall 23 of rectangular-shaped read/write head frame 10. The worker adjusts screw 14 at step 914 to provide a precisely controlled clamping force to force read/write heads 11, 12 into alignment against inner wall 24 of rectangular-shaped read/write head frame 10.

The read/write head module 10 is now fully assembled. At step 915, the worker loosens locking screw 218 to release brass shield 14 from brass shield loader apparatus 200. At step 916, the worker releases locking mechanism 207-210 and at step 917, the worker activates loading arm 213 to relocate into the DOWN position. The worker at step 918 removes alignment tool 104 by rotating alignment tool 104 around pivot 106 in a clockwise direction leaving rectangular-shaped read/write head frame 10 with read head 11 and write head 12 securely fastened in the rectangular opening therein by means of spring 13 and screw 14. At step 919, the worker releases the assembled magnetic tape drive read/write head module from frame fixture 103 by rotating threaded rods 121, 122.

While a specific embodiment of this invention has been disclosed it is expected that those skilled in the art can and will devise variations of the disclosed embodiment which variations fall within the scope of the appended claims.

I claim:

1. A method of assembling magnetic tape drive read head and write head modules comprising the steps of:
   securing a rectangular-shaped read/write head frame, wherein said read/write head frame has a rectangular-shaped opening for placing said read head and write head therein;
   magnetically suspending a read head and a write head in said rectangular-shaped opening in said read/write head frame;
   adjusting the position of said read head and write head with respect to two opposite inner walls of said read/write head frame;
   clamping said positioned read head and write head against a third one of said inner walls of said rectangular-shaped opening in said read/write head frame.

2. The method of claim 1 wherein said step of magnetically suspending includes the step of:
   rotatably inserting said suspended read head and write head into said rectangular-shaped opening in said read/write head frame.

3. The method of claim 1 wherein said step of adjusting includes the step of:
   laterally modifying the position of said read head between said two opposite inner walls of said rectangular-shaped opening in said read/write head frame.

4. The method of claim 3 wherein said step of adjusting further includes the step of:
   visually monitoring the position of said write head between said two opposite walls of said rectangular-shaped opening in said read/write head frame.

5. The method of claim 1 wherein said step of adjusting includes the step of:
   laterally modifying the position of said write head between said two opposite walls of said rectangular-shaped opening in said read/write head frame.

6. The method of claim 5 wherein said step of adjusting further includes the step of:
   visually monitoring the position of said write head between said two opposite walls of said rectangular-shaped opening in said read/write head frame.

7. The method of claim 1 wherein said step of clamping includes the step of:
   inserting a spring between said read/write heads and a fourth inner wall of said rectangular-shaped opening in said read/write head frame to force said read/write heads against said third inner wall of said rectangular-shaped opening in said read/write head frame.

8. The method of claim 1 further including the step of:
   inserting a brass shield in juxtaposed position to said suspended read head in said rectangular-shaped opening in said read/write head frame.

9. A method of assembling magnetic tape drive read head and write head modules comprising the steps of:
   securing a rectangular-shaped read/write head frame, wherein said read/write head frame has a rectangular-shaped opening for placing said read head and write head therein;
   magnetically suspending a read head in said rectangular-shaped opening in said read/write head frame;
   inserting a brass shield in juxtaposed position to said suspended read head in said rectangular-shaped opening in said read/write head frame;
   magnetically suspending a write head in said rectangular-shaped opening in said read/write head frame in juxtaposed position to said brass shield;
   adjusting the position of said read head and write head with respect to two opposite inner walls of said read/write head frame;
   clamping said positioned read head and write head against a third one of said inner walls of said rectangular-shaped opening in said read/write head frame.

10. The method of claim 9 wherein said step of magnetically suspending includes the step of:
    rotatably inserting said suspended read head into said rectangular-shaped opening in said read/write head frame.

11. The method of claim 9 wherein said step of adjusting includes the step of:
    laterally modifying the position of said read head between said two opposite inner walls of said rectangular-shaped opening in said read/write head frame.

12. The method of claim 11 wherein said step of adjusting further includes the step of:
    visually monitoring the position of said write head between said two opposite walls of said rectangular-shaped opening in said read/write head frame.

13. The method of claim 9 wherein said step of adjusting includes the step of:
    laterally modifying the position of said write head between said two opposite walls of said rectangular-shaped opening in said read/write head frame.

14. The method of claim 13 wherein said step of adjusting further includes the step of:
    visually monitoring the position of said write head between said two opposite walls of said rectangular-shaped opening in said read/write head frame.

15. The method of claim 9 wherein said step of clamping includes the step of:
    inserting a spring between said read/write heads and a fourth inner wall of said rectangular-shaped opening in said read/write head frame to force said read/write heads against said third inner wall of said rectangular-shaped opening in said read/write head frame.

16. A method of assembling magnetic tape drive read head and write head modules comprising the steps of:

securing a rectangular-shaped read/write head frame, wherein said read/write head frame has a rectangular-shaped opening for placing said read head and write head therein;

magnetically suspending a read head in said rectangular-shaped opening in said read/write head frame;

positioning a metal shield in juxtaposed position to said suspended read head;

magnetically suspending a write head in said rectangular-shaped opening in said read/write head frame in a position juxtaposed to said metal shield;

adjusting the position of said read head and write head with respect to two opposite inner walls of said read/write head frame, including the steps of:

laterally modifying the position of said read head between said two opposite inner walls of said rectangular-shaped opening in said read/write head frame, visually monitoring the position of said write head between said two opposite walls of said rectangular-shaped opening in said read/write head frame, clamping said positioned read head and write head against a third one of said inner walls of said rectangular-shaped opening in said read/write head frame, including the step of:

inserting a spring between said read/write heads and a fourth inner wall of said rectangular-shaped opening in said read/write head frame to force said read/write heads against said third inner wall of said rectangular-shaped opening in said read/write head frame.

* * * * *